US009537665B2

(12) United States Patent
Bilgin et al.

(10) Patent No.: US 9,537,665 B2
(45) Date of Patent: *Jan. 3, 2017

(54) METHOD, APPARATUS, AND SYSTEM FOR ENABLING PLATFORM POWER STATES

(71) Applicant: Intel Corporation, Santa Clara, CA (US)

(72) Inventors: Selim Bilgin, Hillsboro, OR (US); Lily P. Looi, Portland, OR (US); Jeffrey C. Swanson, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 202 days.

This patent is subject to a terminal disclaimer.

(21) Appl. No.: 13/971,729

(22) Filed: Aug. 20, 2013

(65) Prior Publication Data

US 2013/0336336 A1 Dec. 19, 2013

Related U.S. Application Data

(63) Continuation of application No. 12/798,478, filed on Apr. 5, 2010, now Pat. No. 8,539,260.

(51) Int. Cl.
*G06F 1/32* (2006.01)
*H04L 12/12* (2006.01)
*H04L 12/10* (2006.01)

(52) U.S. Cl.
CPC .............. *H04L 12/12* (2013.01); *G06F 1/3203* (2013.01); *H04L 12/10* (2013.01)

(58) Field of Classification Search
CPC .......................... H04L 12/12; G06F 1/3203
See application file for complete search history.

(56) References Cited

U.S. PATENT DOCUMENTS 6,961,780 B2  11/2005  Kuusinen et al.
8,073,984 B2  12/2011  Lydon et al.
(Continued)

FOREIGN PATENT DOCUMENTS

CN  1433656 A  7/2003
CN  1720087 A  1/2006
(Continued)

OTHER PUBLICATIONS

Office Action received for counterpart Japanese Patent Application No. 2011-082525, mailed May 22, 2012, (w/English Translation) 5 pages.

(Continued)

*Primary Examiner* — Fahmida Rahman
(74) *Attorney, Agent, or Firm* — Blakely, Sokoloff, Taylor & Zafman LLP

(57) ABSTRACT

To address the need for power management, the following facilitates maintaining power states in an efficient manner based at least in part on managing packets at different layers of an input/output interface that supports multiple layers. One specific example prevents a destructive event for link layer control logic because packets and information might have been lost or dropped due to a hang condition and/or a dropped packet. In yet another example of power management, this facilitates a low power platform state by preventing the loss of packets or data upon exiting a platform power state upon initiation of a link reset condition by preventing certain types of packets from reaching link layer controller logic.

27 Claims, 10 Drawing Sheets

(56) References Cited

U.S. PATENT DOCUMENTS

| | | | |
|---|---|---|---|
| 8,429,316 B1 * | 4/2013 | White | G06F 13/4022 710/1 |
| 2002/0087723 A1 * | 7/2002 | Williams | H04L 12/5602 709/240 |
| 2004/0003286 A1 | 1/2004 | Kaler et al. | |
| 2005/0097378 A1 * | 5/2005 | Hwang | G06F 1/3203 713/320 |
| 2006/0212732 A1 | 9/2006 | Mashimo et al. | |
| 2006/0268709 A1 * | 11/2006 | Singla | H04L 12/5693 370/235 |
| 2007/0127581 A1 | 6/2007 | Connor et al. | |
| 2007/0271387 A1 | 11/2007 | Lydon et al. | |
| 2008/0005636 A1 | 1/2008 | Conrad et al. | |
| 2010/0290380 A1 * | 11/2010 | Tsai et al. | 370/311 |

FOREIGN PATENT DOCUMENTS

| | | |
|---|---|---|
| JP | 2005-267100 | 9/2005 |
| JP | 2006-261854 | 9/2006 |
| JP | 2009-538562 | 11/2009 |
| WO | WO 2007/139660 A2 | 12/2007 |

OTHER PUBLICATIONS

English translation of First Office Action received for counterpart Chinese Patent Application No. 201110094621.7 mailed Sep. 5, 2013, 7 pages.

English translation of Second Office Action received for counterpart Chinese Patent Application No. 201110094621.7 mailed Jul. 22, 2014, 7 pages.

English translation of Third Office Action received for counterpart Chinese Patent Application No. 201110094621.7 mailed Jan. 27, 2015, 4 pages.

\* cited by examiner

METHOD, APPARATUS, AND SYSTEM FOR ENABLING PLATFORM POWER STATES

REFERENCE TO RELATED APPLICATION

This application is a continuation of and claims priority to U.S. application Ser. No. 12/798,478, filed Apr. 5, 2010, which issued as U.S. Pat. No. 8,539,260 on Sep. 17, 2013.

FIELD OF THE INVENTION

Embodiments of the invention relate to the field of power management, and according to one embodiment, a method and apparatus, and system for managing packets with respect to layers and link layer control logic.

BACKGROUND

With the increasing importance of reducing the power consumption of computing platforms, the processor architecture and design trends are moving towards a direction where more opportunities of total power gating are being pursued.

Power gating is the technique wherein circuit blocks that are not in use are temporarily turned off to reduce the overall leakage power of the chip. This temporary shutdown time can also call as "low power mode" or "inactive mode". In contrast, when circuit blocks are required for operation once again they are activated to "active mode". These two modes are switched at the appropriate time and in the suitable manner to maximize power performance while minimizing impact to performance. Thus goal of power gating is to minimize leakage power by temporarily cutting power off to selective blocks that are not required in that mode.

As an electronic device transitions to a low power state from an active mode power state, the state information of the respective device is saved to ensure proper operation upon a subsequent exit from the low power state. Unfortunately, maintaining an excessive amount of on-die memory to store the necessary state information is cost prohibitive.

Typically, high speed interfaces utilize a physical layer and a link layer to facilitate the transmission of information. One example of a solution for an efficient means of exiting a low power state is a link reset for the layers associated with the high speed interface. The main purpose of the link reset is to recover a failing link. Nonetheless, this feature enables a control layer of an input/output interface that support multiples layers, such as, protocol, link, and physical to start operation with a clean slate immediately followed by a handshake and parameter exchange. However, in some cases, link reset is a destructive event for link layer control logic because any packets and information in flight will get dropped.

DETAILED DESCRIPTION

In various embodiments, the following descriptions of the figures facilitates maintaining power states in an efficient manner based at least in part on managing packets at different layers of an input/output interface that supports multiple layers. One specific example is an embodiment that prevents a destructive event for link layer control logic because packets and information might have been lost or dropped due to a hang condition and/or a dropped packet. In yet another example of an embodiment, the claimed subject matter facilitates a low power platform state by preventing the loss of packets or data upon exiting a platform power state upon initiation of a link reset condition by preventing certain types of packets from reaching a link layer controller logic.

In summary, in various embodiments, an agent facilitates a low platform power state by supporting a mode that prevents certain types of packets from reaching a link layer controller logic. First, the mode of operation is enabled. Subsequently, a link low power state is entered for the particular link. Eventually, the processor cores and glue logic will enter a low platform power state.

As is well known, a power state referred to as a "C-state" manages power consumption at a processor core level. In addition to the C state, the claimed subject matter utilizes common logic that communicates with both multi-core devices and acts as a glue for both cores. In one embodiment, the common logic may be referred to as uncore. However, it is not limited to this depiction. One may utilize a system interface as a common logic to both cores. In summary, if both the cores and uncore adhere to a low power state; the entire platform will be in a low platform power state.

Figure 1:
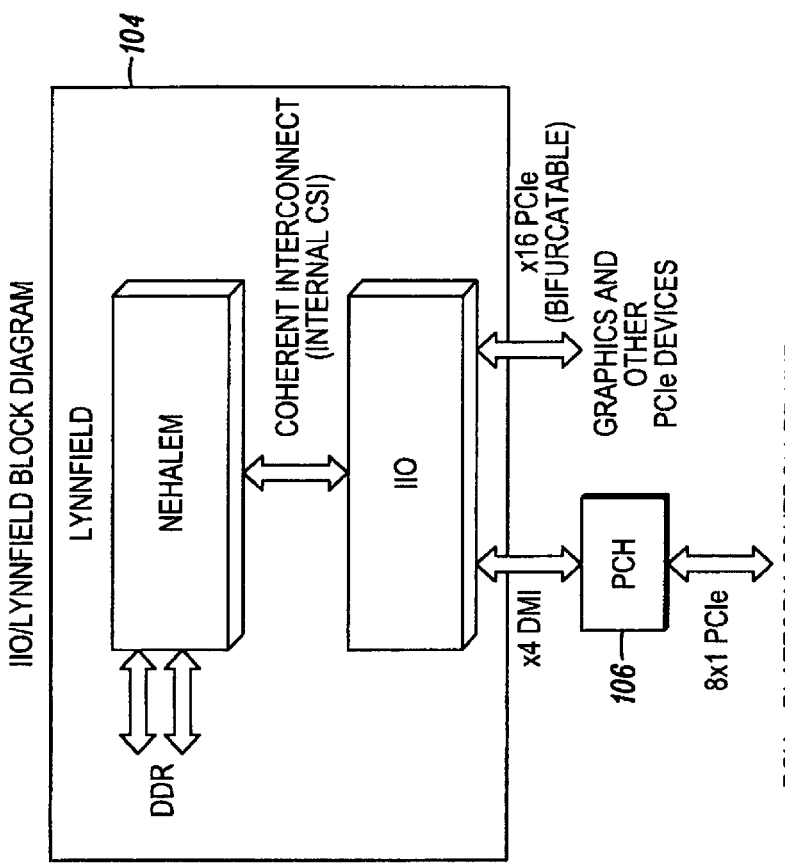
FIG. 1 is a block diagram of an agent in accordance with an embodiment of the present invention.

FIG. 1 is a block diagram of an agent in accordance with an embodiment of the present invention. In this embodiment, the agent 104 comprises a processor core coupled to an integrated input output block. In one embodiment, the agent may be the Intel Lynnfield product, also known as, Intel® Core™ i5-750, Core™ i7-860, and Core™ 17-870 processors as well as the Xeon X3400 processor series that includes a Nehalem core with a memory controller hub (MCH) or Integrated Input Output block (IIO) in the same package. In one embodiment, the core communicates with the IIO via the Intel QuickPath Interconnect (QPI, also known as CSI).

However, the claimed subject matter is not limited to a product that includes a MCH/IIO within a same package as a processor core. Furthermore, it is not limited to a QPI interconnect between the processor core and IIO. In this embodiment, the agent may be coupled to a Platform Controller Hub (106) via a Direct Media Interface (DMI) interconnect. However, the claimed subject matter is not limited to the agent being coupled to a PCH via a DMI interconnect.

In yet another embodiment, the agent may be utilized in a network fabric that is depicted in connection with FIG. 2 that will be discussed later.

Figure 2:
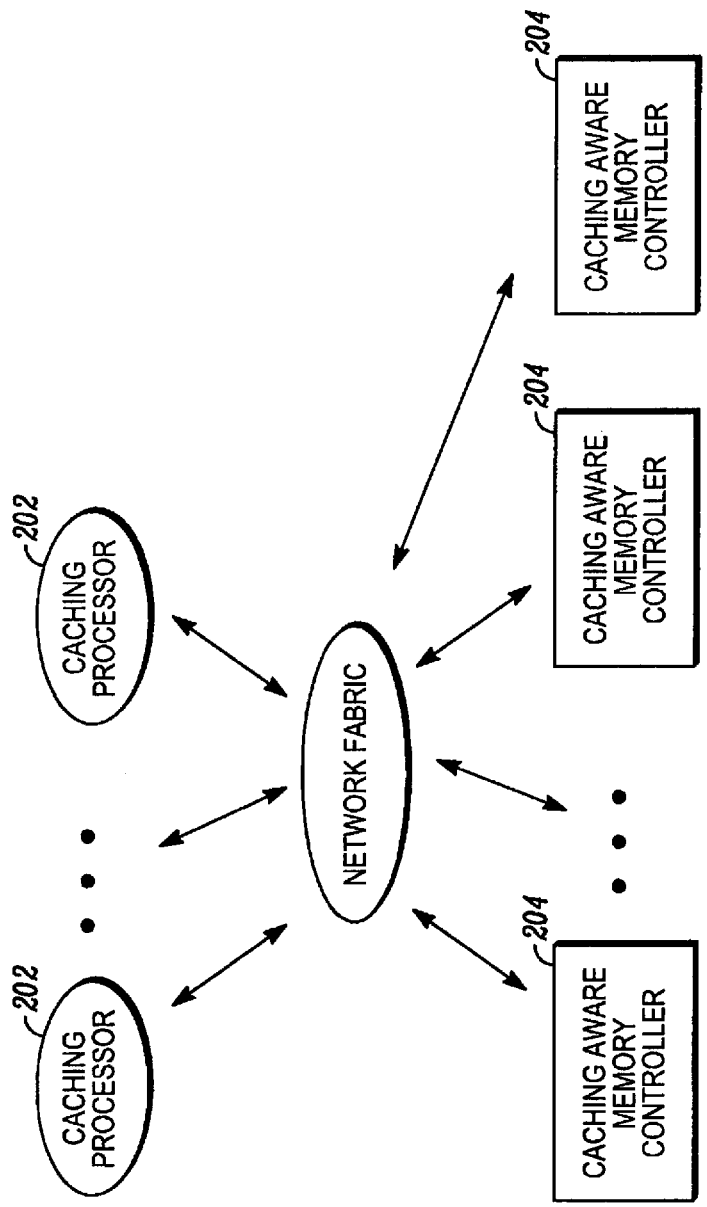
FIG. 2 is a protocol architecture as utilized by one embodiment of the present invention.

FIG. 2 is a protocol architecture as utilized by one embodiment. The architecture depicts a plurality of agents coupled to a network fabric. In one embodiment, the agents may all be caching processors 202 and caching aware memory controllers 204. In contrast, in yet another embodiment, some of the agents are caching agents.

For example, the network fabric adheres to a layered protocol scheme and may comprise either or all of: a physical layer, a link layer, a protocol layer, a routing layer, a transport layer, and a protocol layer. In another embodiment, the layered protocol scheme comprises only a physical layer, a link layer, a routing layer, and a protocol layer. In yet another embodiment, the layered protocol scheme comprises only a physical layer, a link layer, and a protocol layer.

The fabric facilitates transporting messages from one protocol (home or caching agent) to another protocol for a point to point network. In one aspect, the figure depicts a cache coherence protocol's abstract view of the underlying network.

Figure 3:
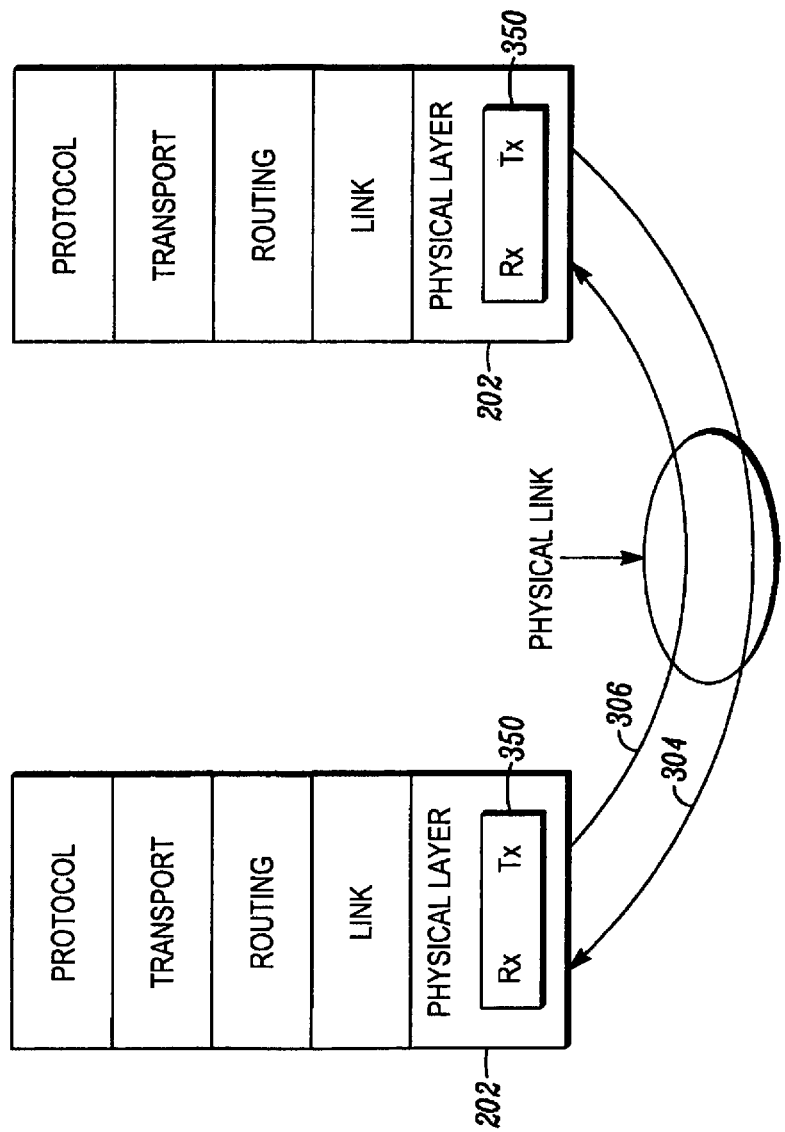
FIG. 3 is a block diagram for a physical interconnect utilized in accordance with the claimed subject matter.

FIG. 3 is a block diagram of an apparatus for a physical interconnect utilized in accordance with the claimed subject matter. In one embodiment, the apparatus depicts a physical layer for a cache-coherent, link-based interconnect scheme for a processor, chipset, and/or 10 bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

However, the layered protocol scheme is not limited to the depicted layers. In contrast, in another embodiment, the layered protocol scheme may comprise either or all of: a link layer, a physical layer, a protocol layer, and a routing layer. In yet another embodiment, the layered protocol scheme comprises only a link layer, a physical layer, and a protocol layer.

Figure 4:
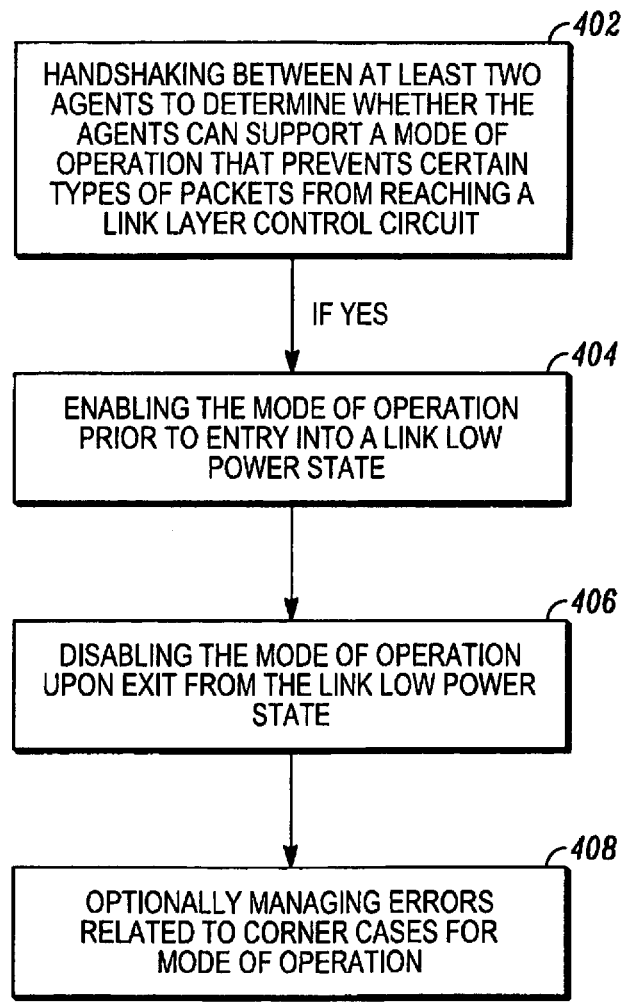
FIG. 4 is a method for managing a power state utilized in accordance with the claimed subject matter.

FIG. 4 is a method for managing a power state utilized in accordance with the claimed subject matter. In this embodiment, the flowchart depicts a method for managing a power state for preventing loss of packets or data upon exiting a platform power state. In a specific embodiment, the method for managing a power state prevents loss of packets or data upon exiting a platform power state upon initiation of a link reset condition. In yet still another specific embodiment, the method for managing a power state prevents loss of packets or data upon exiting a platform power state upon initiation of a link reset condition by preventing certain types of packets from reaching a link layer controller logic.

In one embodiment, the certain types of packets that are prevented from reaching the link layer controller logic might have resulted in a destructive or hang condition. For example, some examples of packet types that are prevented may include, but are not limited to, any packet that causes the platform to eventually hang if lost. For example, the transmitting agent or circuit thinks it is sent, but either that did not materialize or the receiving agent or circuit might have not received it). Specifically, for one embodiment of a QPI (QuickPath interconnect) the types of packets are protocol layer packets, that may belong to any of the eight Virtual Channels; HOM, SNP, NDR, DRS, NCB, NCS, ICS and IDS.

In yet another embodiment that utilizes QPI, the certain type of packet may be determined from a link layer perspective, these packets are identified through the upper nibble of their 8-bit opcode. Therefore, these packets are used by the protocol layer of the fabric to initiate transactions or respond to existing ones.

However, the claimed subject matter is not limited to the QPI implementation and/or the virtual channels. One skilled in the art appreciates defining the type of data and packet to prevent from reaching a link layer controller logic based on other factors such as, priority, interrupts, timing, latency, reliability, etc.

In a decision block 402, a handshaking occurs between at least two agents to determine whether the agents support the mode of operation for the low power state and to prevent certain types of packets of reaching the link layer controller logic. Specifically, the agents utilize the existing link initialization and parameter exchange protocols of their respective input/output link or fabric in use to communicate their ability to support this mode if requested as well as their request for the remote agent to support this mode in its corresponding layers of control. Based on the resolution of this handshake, the devices can then decide the platform's capability to go into lower power states as well as turning on the support for the mode of preventing certain types of packets of reaching the link layer controller logic.

In an action block 404, the agents are enabling the mode of operation for preventing certain types of packets of reaching the link layer controller logic upon entry into a low platform power state. In one embodiment, the entry point to this low platform power state is either the initiation or the acknowledgement of the request to enter the link low power state, depending on the agent asserting backpressure being the initiator (master) or the responder (slave) on the protocol.

In summary, in one embodiment, the mode of operation of preventing certain types of packets of reaching the link layer occurs prior to a link low power mode. In this embodiment, this mode of operation is referred to as backpressure. Furthermore, the link low power mode occurs prior to the platform low power mode.

In an action block 406, one agent is disabling the mode of operation upon exit from the link low power state.

After power is restored to the component(s), the agent(s) which asked the remote agent to enable backpressure is responsible for either sending a special packet or initiating a link initialization. The agents that have backpressure enabled are responsible to remove it when they observe the initiation of link initialization or when they receive the above mentioned special packet. If power was removed in the process, clearly there is no notion of backpressure remaining in that particular agent on the platform; hence it is automatically released to be followed by link initialization. Other cases where agents remove backpressure when enabled include the failed entry to the link power state (master initiating the request and the slave not acknowledging) and the case where a critical packet (retriable packet in QPI terminology) is received.

In action block 408, the agent may optionally manage conditions related to corner cases for the mode of operation of preventing certain packets from reaching the link layer controller logic. For example, in one optional embodiment, if the agent that is the responder (slave) to the link low power entry initiation receives an erroneous packet after acknowledging the entry into the link low power state, when backpressure is enabled, it will abort the expected entry into the link low power state, keep backpressure intact and will also take the precaution not to send any critical packets down the fabric. It will need to handle the communication error recovery as indicated by the corresponding specification of the high speed I/O controller implementation. When backpressure is disabled, such issues are normally handled by the slave agent by keeping the expected entry into the link low power state intact.

Figure 5:
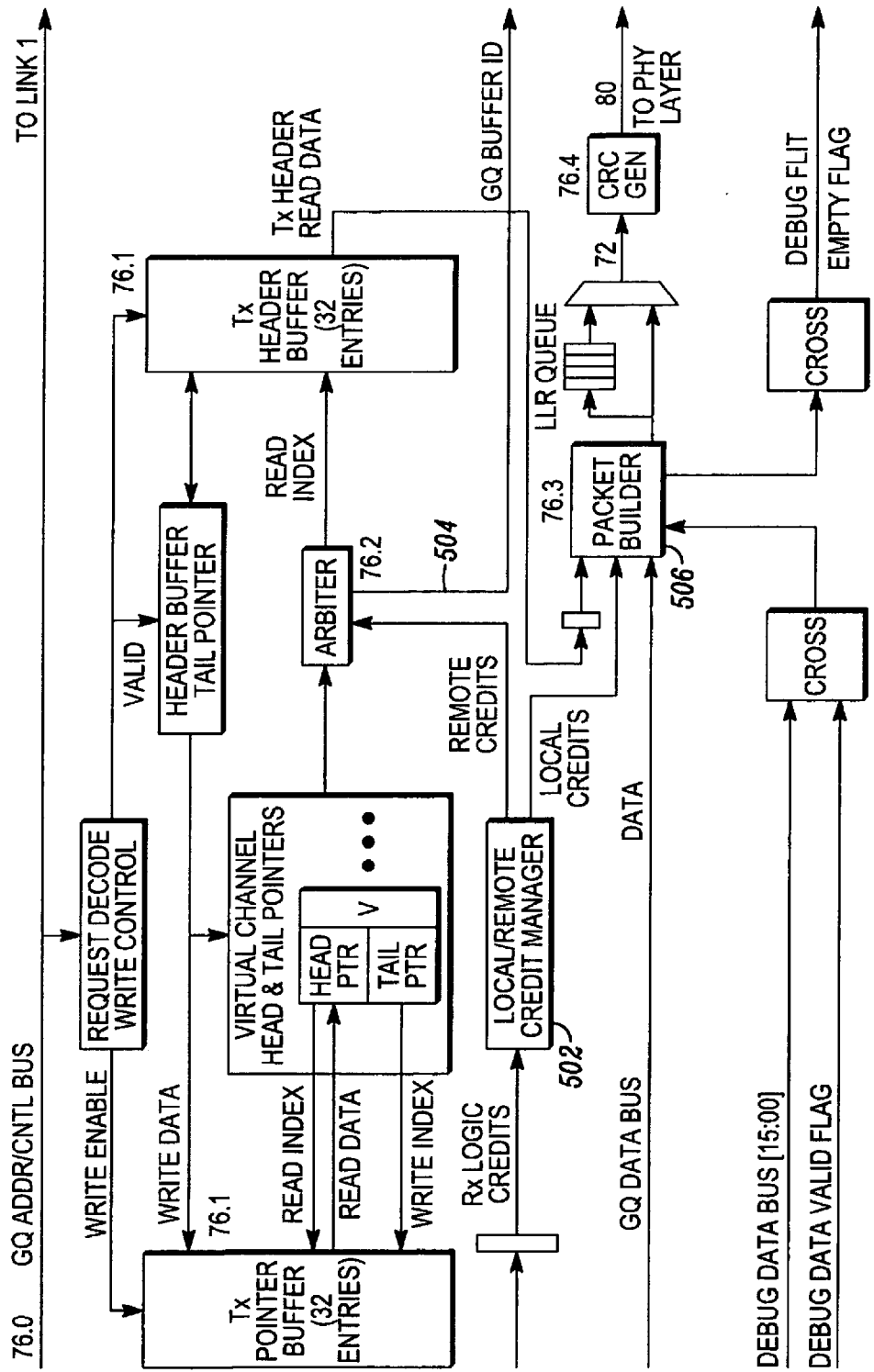
FIG. 5 is a block diagram of a link layer utilized in accordance with the claimed subject matter.

FIG. 5 is a block diagram of a link layer utilized in accordance with the claimed subject matter. In this diagram, a transmitter portion block diagram is utilized. As previously discussed, a mode of operation of preventing certain types of packets from reaching a link layer controller portion.

In one embodiment, blocks 502 and 504, credit manager and arbiter, depict link layer controller circuitry to facilitate this mode of operation for preventing certain types of packets from reaching the link layer by manipulating the credits such that the transmit block has zero credits to prevent any transmission of packets. In one embodiment, credit manager" and arbiter indicate a situation of no credit availability. In this embodiment, credits are required to be able to arbitrate, build, and send down a protocol layer message. Consequently, the backpressure is achieved due to the lack of credits to arbitrate, build, and send down the protocol layer message. In this embodiment, backpressure results in preventing the protocol layer messages from reaching the packet builder circuitry 506.

However, the claimed subject matter is not limited to the preceding embodiments of manipulating credits to prevent transmission of packets to achieve back pressure. Alternatively, in other embodiments, the packets may be stalled or blocked at a point where the request for the protocol level packet comes in. Alternatively, in another embodiment, the packets may be stalled or blocked prior to leaving the package. In still another embodiment, a memory structure is utilized to replay a packet in the event they are lost. For example, in a specific embodiment for QPI, one may utilize a Link Level Retry Queue.

Figure 6:
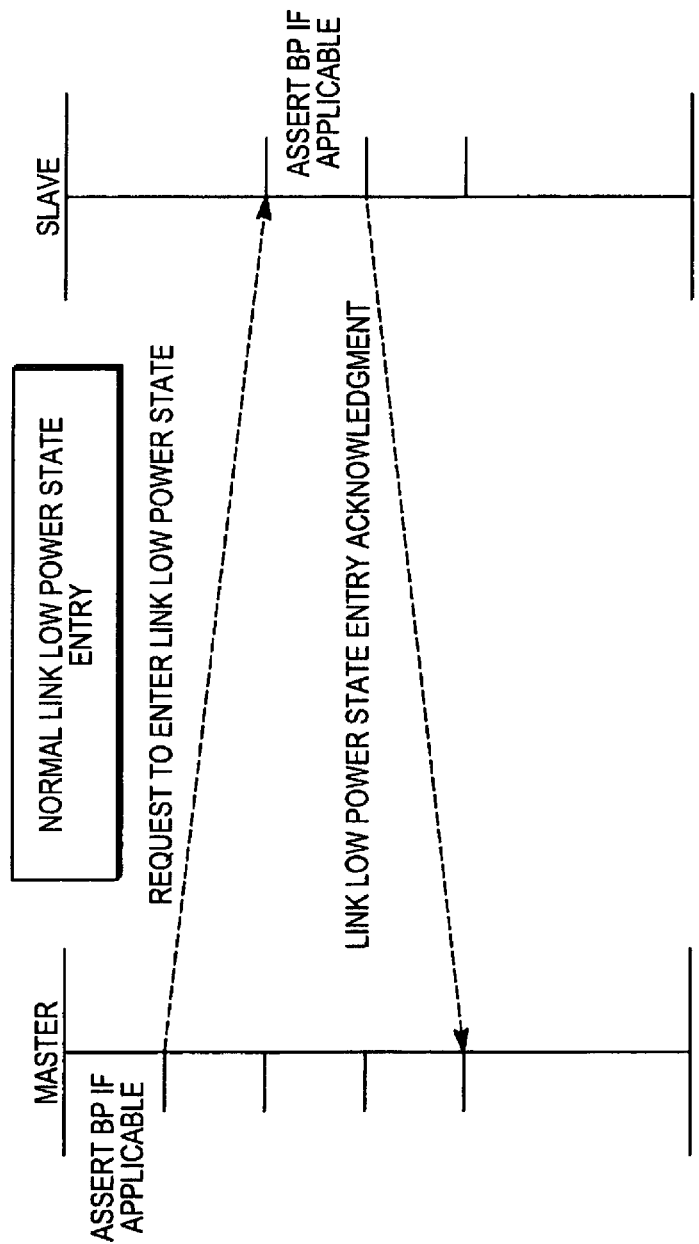
FIG. 6 is a timing diagram utilized in accordance with the claimed subject matter.

FIG. 6 is a timing diagram utilized in accordance with the claimed subject matter. In this embodiment, a master and a slave agent communicate via signals. Initially, if the master supports the mode of operation, the master asserts the mode of operation for preventing certain types of packets from reaching the link layer controller logic (designated as BP) and requests to enter the link low power state to the slave. In response, if the slave supports the mode of operation, the slave asserts the mode of operation for preventing certain types of packets from reaching the link layer controller logic (designated as BP) and acknowledges the link low power state to the master.

Figure 7:
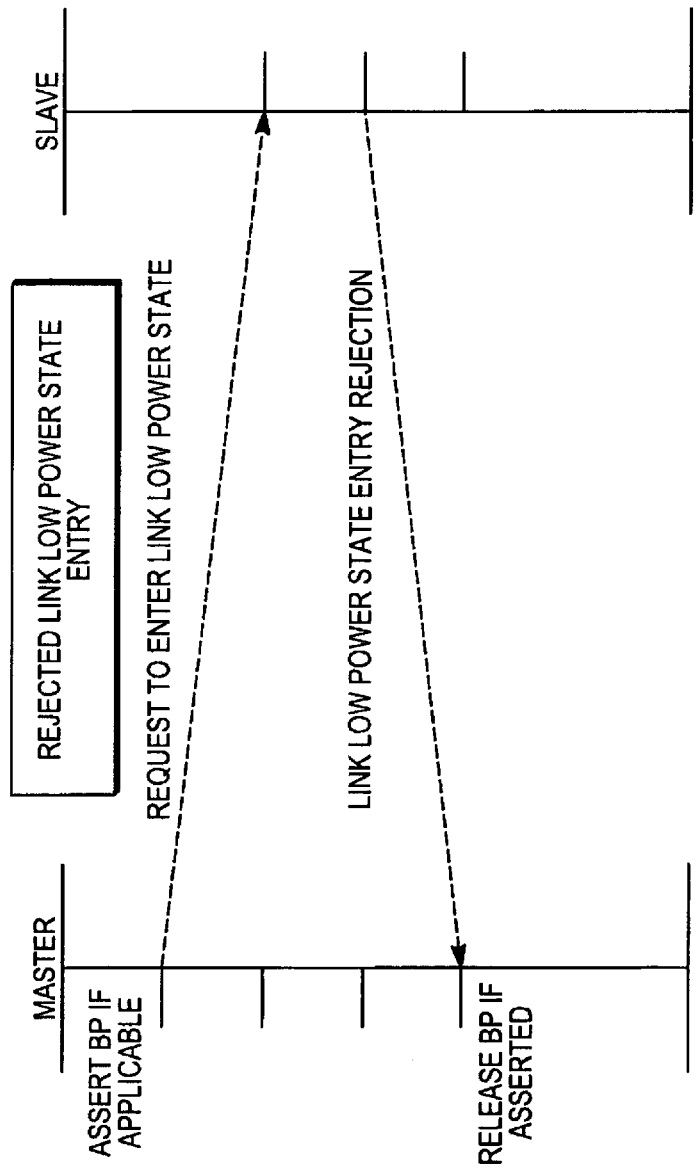
FIG. 7 is a timing diagram utilized in accordance with the claimed subject matter.

FIG. 7 is a timing diagram utilized in accordance with the claimed subject matter. In contrast to FIG. 6, this figure depicts the slave rejecting the power state since it fails to support the mode of operation.

Figure 8:
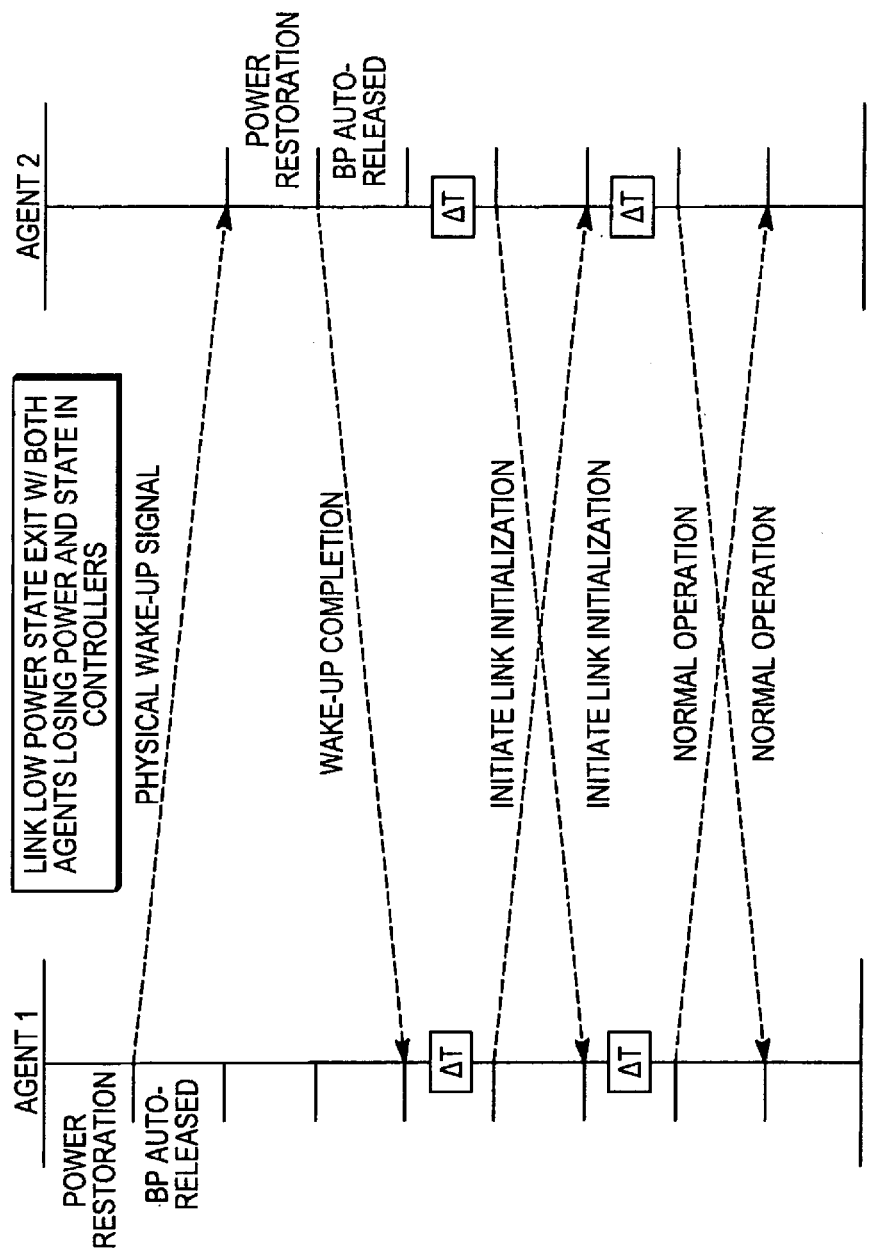
FIG. 8 is a timing diagram utilized in accordance with the claimed subject matter.

FIG. 8 is a timing diagram utilized in accordance with the claimed subject matter. This timing diagram illustrates exiting the link low power state and initiating wake up and link initialization that concludes in normal operation for both agents.

Figure 9:
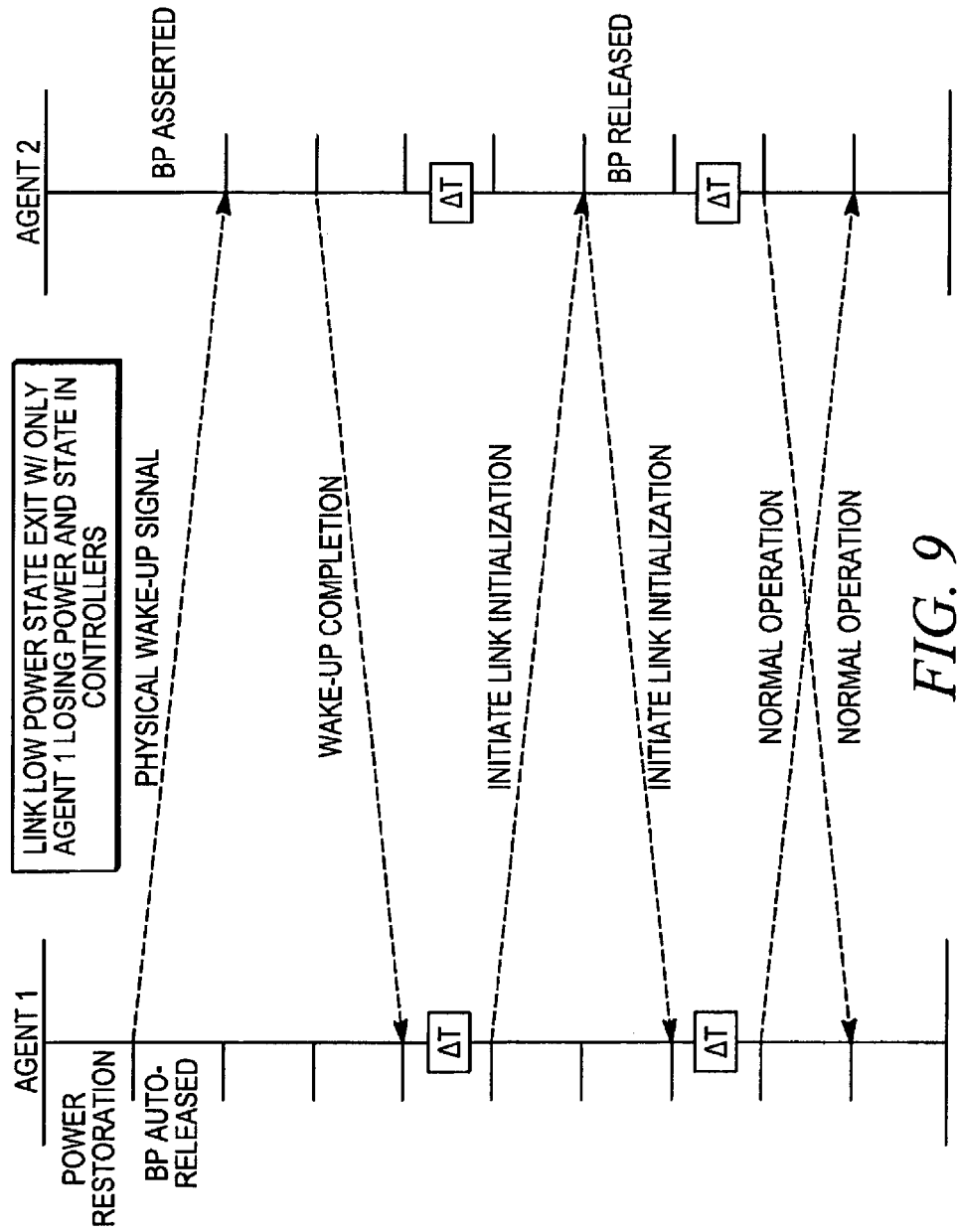
FIG. 9 is a timing diagram utilized in accordance with the claimed subject matter.

FIG. 9 is a timing diagram utilized in accordance with the claimed subject matter. This timing diagram illustrates exiting the link low power state and initiating wake up and link initialization that concludes in normal operation for only agent 1.

Figure 10:
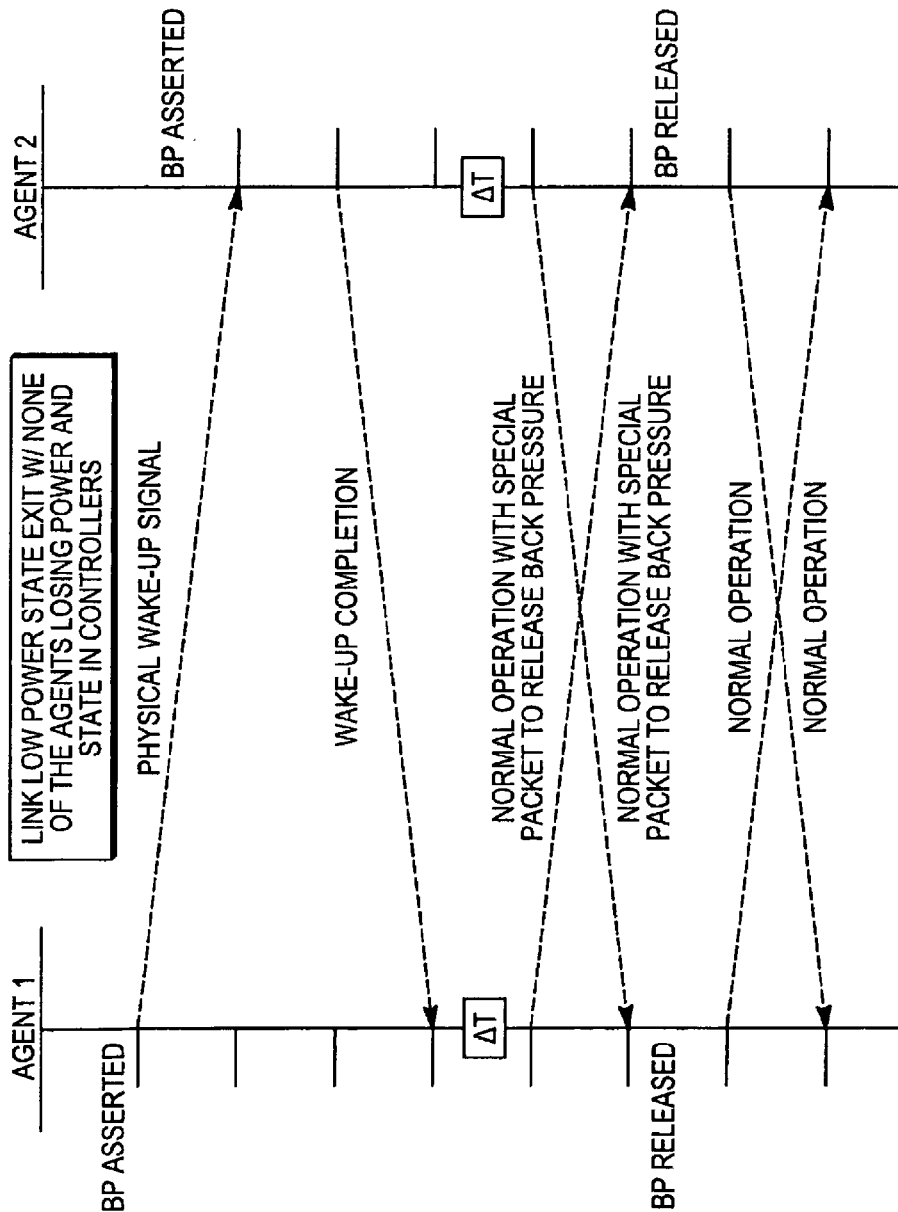
FIG. 10 is a timing diagram utilized in accordance with the claimed subject matter.

FIG. 10 is a timing diagram utilized in accordance with the claimed subject matter. This timing diagram illustrates exiting the link low power state and initiating wake up and link initialization that concludes in normal operation for none of the agents losing power.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for managing an interface of a first agent, the method comprising:
   determining that a second agent supports a mode of the first agent selective allowance of transmission of a packet of a first packet type and prevention of transmission of a packet of a second packet type from the first agent to the second agent, wherein determining includes handshaking between the first and second agent to determine, by the first agent, that the second agent supports the mode of the first agent selective allowance of transmission of a packet of the first packet type and prevention of transmission of a packet of the second packet type from the first agent to the second agent;
   prior to entry into a low power state, the first agent enabling the selective allowance to transmit the first packet type and prevention of transmission of the second packet type by the first agent to the second agent; and
   upon exit from the low power state, the first agent enabling allowance of transmission from the first agent of packets of both the first and second packet types, wherein exiting includes performing a link layer reset.

2. The method of claim 1, wherein the interface supports a link layer and a physical layer.

3. The method of claim 1, wherein the first packet types that are selectively allowed could not result in a destructive or hang condition.

4. The method of claim 1, wherein the second packet types that are prevented are protocol layer packets that are used to initiate transactions or respond to existing transactions of a quick path interconnect (QPI) protocol layer used by the interface.

5. The method of claim 1, wherein the first and the second packet types are identifiable by at least one field of their packets.

6. The method of claim 1, wherein the first and second agents are caching processors or caching aware memory controller; and wherein the first and second agents are communicating with each other using a high speed input/output (IO) fabric.

7. An interface for a first agent comprising:
a physical layer of the interface of the first agent to handshake between the first agent and a second agent to determine that the second agent supports the mode of the first agent selective allowance of transmission of a packet of a first packet type and prevention of transmission of a packet of a second packet type from the first agent to the second agent when the first agent is in a low power state;
the physical layer to transmit an enable signal to the second agent, the enable signal to request to enter a mode of operation of the first agent that is to allow transmission of a first packet type and prevent transmission of a second packet type to be transmitted from the first agent to the second agent when in the low power state; and
a control circuit to disable the mode of operation upon a certain condition to facilitate normal mode of operation, wherein disabling includes performing a link layer reset.

8. The interface of claim 7, wherein the certain condition is a special packet.

9. The interface of claim 7, wherein the certain condition is a link initialization.

10. The interface of claim 7, wherein the interface supports a link layer and a physical layer.

11. The interface of claim 7, wherein the first packet types of packets that are allowed could not result in a destructive or hang condition.

12. The interface of claim 7, wherein the packets of the second packet type are protocol layer packets that are used to initiate transactions or respond to existing transactions of a quick path interconnect (QPI) protocol layer used by the interface.

13. The interface of claim 7, wherein the first and second agents are caching processors or caching aware memory controller; wherein the first and second agents are communicating with each other using a high speed input/output (IO) fabric; and wherein the interface to transmit the enable signal is an interface of the first agent.

14. The interface of claim 7, wherein the first and the second packet types are identifiable by at least one field of the packet.

15. An apparatus comprising:
a physical layer of an interface of a first agent to handshake between the first agent and a second agent to determine that the second agent supports a mode of the first agent selective allowance of transmission of a packet of a first packet type and prevention of transmission of a packet of a second packet type from the first agent to the second agent when the first agent is in a low power state;
the physical layer to transmit an enable signal from the first agent to the second agent, the enable signal to request to enter the mode of operation of the first agent that is to allow transmission of the first packet type and prevent transmission of the second packet type to be transmitted from the first agent to the second agent when in the low power state; and
a control circuit to disable the mode of operation upon a certain condition to facilitate normal mode of operation, wherein disabling includes performing a link layer reset.

16. The apparatus of claim 15, wherein the certain condition is a special packet.

17. The apparatus of claim 15, wherein the certain condition is a link initialization.

18. The apparatus of claim 15, wherein the interface supports a link layer and a physical layer.

19. The apparatus of claim 15, wherein the first and second agents are caching processors or caching aware memory controller; wherein the first and second agents are communicating with each other using a high speed input/output (IO) fabric; and wherein the interface to transmit the enable signal is an interface of the first agent.

20. The apparatus of claim 15, wherein the first and the second packet types are identifiable by at least one field of the packet.

21. The apparatus of claim 15, wherein the second packet type are protocol layer packets that are used to initiate transactions or respond to existing transactions of a quick path interconnect (QPI) protocol layer used by the interface.

22. An interface for a first agent comprising:
a physical layer of the interface to transmit an enable signal to a second agent, the enable signal to request to enter a mode of operation of the first agent that is to allow a first packet type and prevent a second packet type to be transmitted from the first agent to the second agent when the first agent is in a low power state;
a control circuit to disable the mode of operation upon a certain condition to facilitate normal mode of operation, wherein disabling includes performing a link layer reset; and
a credit manager circuit to manipulate credits to allow transmission of packets of the first packet type of packet when in the low power state.

23. The interface of claim 22, wherein the first and second agents are caching processors or caching aware memory controller; wherein the first and second agents are communicating with each other using a high speed input/output (IO) fabric; and wherein the interface to transmit the enable signal is an interface of the first agent.

24. An apparatus comprising:
a physical layer of an interface of a first agent to transmit an enable signal to a second agent, the enable signal to request to enter a mode of operation of the first agent that is to allow a first packet type and prevent a second packet type to be transmitted from the first agent to the second agent when the first agent is in a low power state;
a control circuit to disable the mode of operation upon a certain condition to facilitate normal mode of operation, wherein disabling includes performing a link layer reset; and
a credit manager circuit to manipulate credits to allow transmission of the first packet types of packets when in the low power state.

25. The apparatus of claim 24, wherein the first and second agents are caching processors or caching aware memory controller; wherein the first and second agents are communicating with each other using a high speed input/output (IO) fabric; and wherein the interface to transmit the enable signal is an interface of the first agent.

26. A method for managing an interface of a first agent, the method comprising:

determining that a second agent supports a mode of the first agent of selective allowance of transmission of a packet of a first packet type and prevention of transmission of a packet of a second packet type from the first agent to the second agent;

prior to entry into a low power state, the first agent enabling the selective allowance to transmit the first packet type and prevention of the transmission of the second packet type by the first agent to the second agent;

manipulating credits using a credit manager to allow transmission of the first packet type of packets when in the low power state; and upon exit from the low power state, the first agent enabling allowance of transmission from the first agent of packets of both the first and second packet types.

27. The method of claim 26, wherein the first and second agents are caching processors or caching aware memory controller; wherein the first and second agents are communicating with each other using a high speed input/output (IO) fabric; and wherein determining is performed by the first agent.

\* \* \* \* \*